Figure 1:
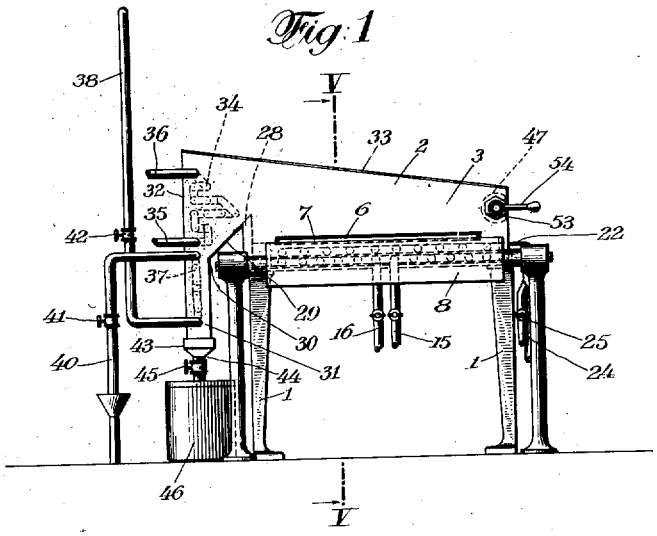

C. R. WALKER.

DRYING SYSTEM.

Reissued Jan. 20, 1914

APPLICATION FILED DEC. 6, 1913.

13,678.

6 SHEETS—SHEET 1.

Witnesses:

W. A. Hutton

J. O. Lampler.

Inventor

Charles R. Walker

By his Attorneys

Kenyon & Kenyon

C. R. WALKER.

DRYING SYSTEM.

Reissued Jan. 20, 1914. 13,678.

APPLICATION FILED DEC. 6, 1913.

6 SHEETS—SHEET 2.

Witnesses:
W. A. Hutton
J. O. Gempler

Inventor
Charles R. Walker
By his Attorneys
Kenyon & Kenyon

C. R. WALKER.

DRYING SYSTEM.

Reissued Jan. 20. 1914. APPLICATION FILED DEC. 6, 1913. 13,678.

6 SHEETS—SHEET 3.

Witnesses:
W. A. Hutton
J. O. Gempler.

Inventor
Charles R. Walker
By his Attorneys
Kenyon & Kenyon

C. R. WALKER.

DRYING SYSTEM.

Reissued Jan. 20, 1914.

APPLICATION FILED DEC. 6, 1913.

13,678.

6 SHEETS—SHEET 4.

Witnesses:

W. A. Hutton

J. O. Gempler.

Inventor

Charles R. Walker

By his Attorneys

Kenyon & Kenyon

C. R. WALKER.

DRYING SYSTEM.

Reissued Jan. 20, 1914. APPLICATION FILED DEC. 6, 1913. 13,678.

6 SHEETS—SHEET 5.

Witnesses:

W. A. Hutton

J. O. Gempler.

Inventor

Charles R. Walker

By his Attorneys

Kenyon & Kenyon

C. R. WALKER.

DRYING SYSTEM.

Reissued Jan. 20, 1914. APPLICATION FILED DEC. 6, 1913. 13,678.

6 SHEETS—SHEET 6.

Witnesses:

W. A. Hutton

L. O. Gempler.

Inventor

Charles R. Walker

By his Attorneys

Kenyon & Kenyon

UNITED STATES PATENT OFFICE.

CHARLES R. WALKER, OF NEWBURGH, NEW YORK.

DRYING SYSTEM.

13,678. Specification of Reissued Letters Patent. Reissued Jan. 20, 1914.

Original No. 1,074,302, dated September 30, 1913, Serial No. 575,430. Application for reissue filed December 6, 1913. Serial No. 805,120½.

*To all whom it may concern:*

Be it known that I, CHARLES R. WALKER, a citizen of the United States, and a resident of Newburgh, county of Orange, State of New York, have invented certain new and useful Improvements in Drying Systems, of which the following is a specification.

My invention relates to improvements in drying systems and more especially to systems for the drying of coated fabrics and the like, and is especially adapted to the drying out of solvents from imitation leather and recovering these solvents.

Various objects of my invention are to provide an improved system and process whereby the material may be thoroughly dried and will be of much better quality than has been able to be obtained heretofore with other systems; to provide a system in which the volume of vaporized solvents is reduced to a minimum, thus decreasing the liability of explosions and decreasing the damage done in case an explosion should occur; to provide a system in which the material is dried in an atmosphere practically saturated with the vapors given off and is so constructed and arranged that an efficient flow is obtained and the vaporized solvents are brought into contact with condensing means in order that they may be recovered.

A further object of my invention is to provide means for the admission of air or a similar gas or gases, at the proper point to affect the flow of gases and quality of the material produced.

Further objects, features and advantages will more clearly appear from the detailed description given below, taken in connection with the accompanying drawings which form a part of this specification and which show one preferred embodiment of my invention.

Figure 2:
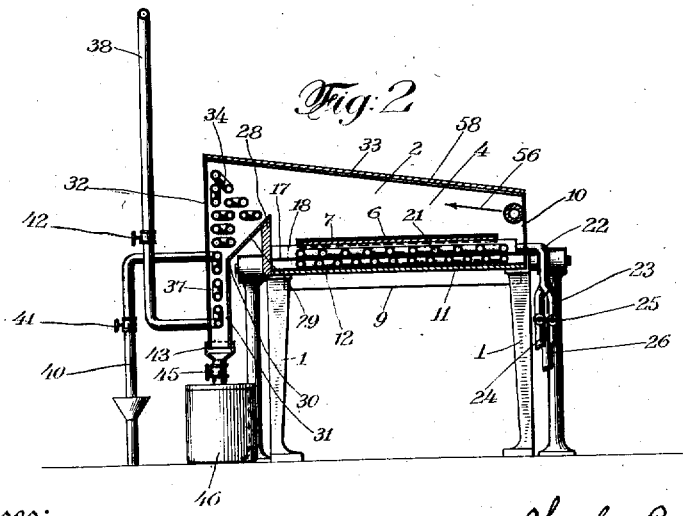
Figure 3:
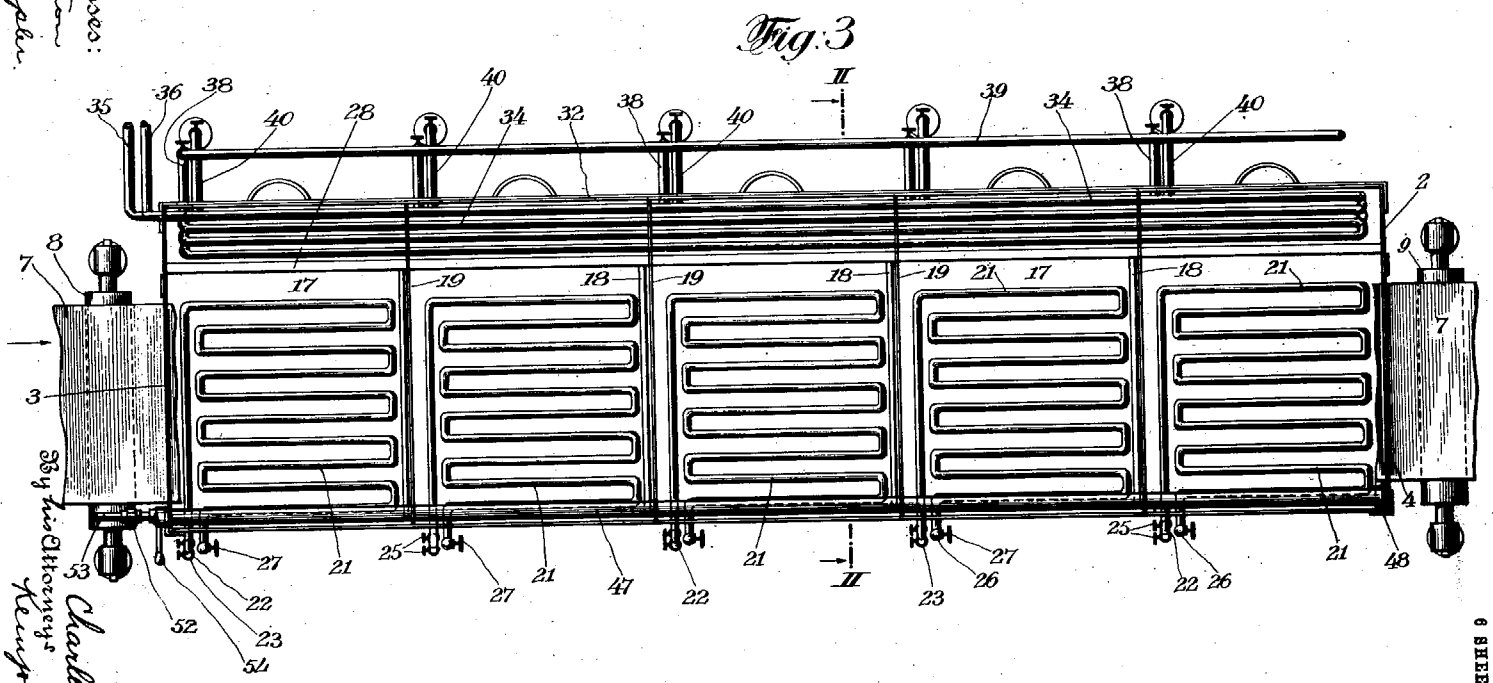
Figure 4:
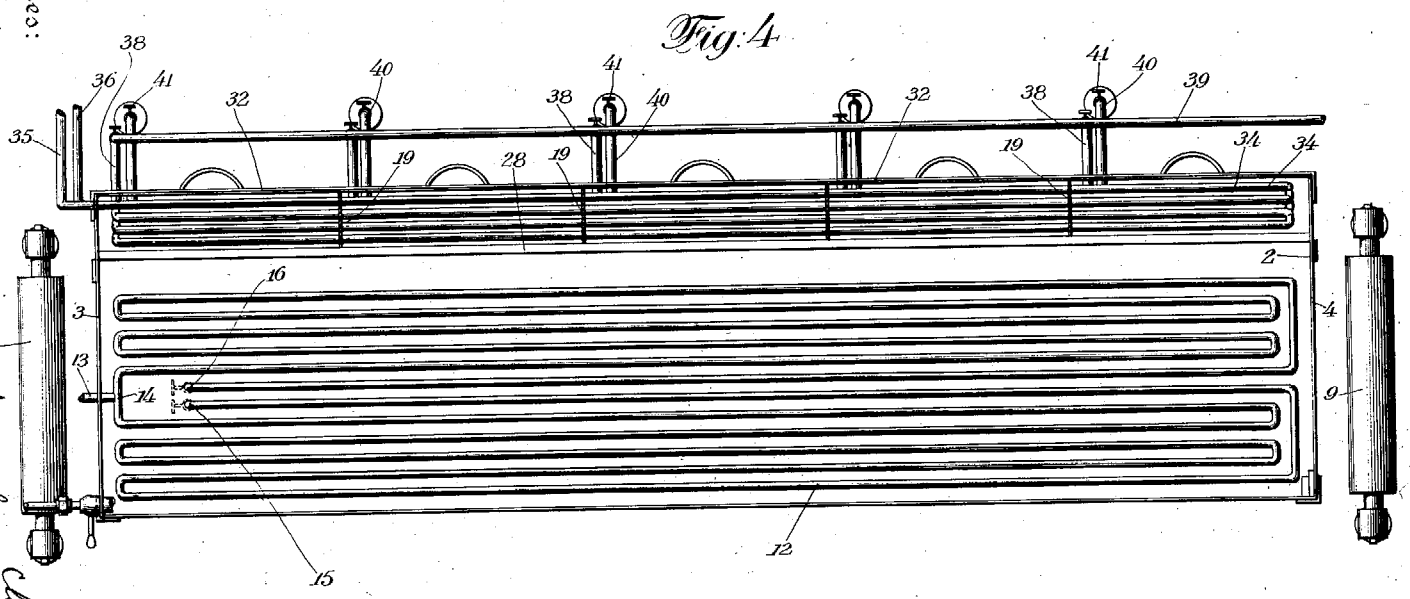
Figure 5:
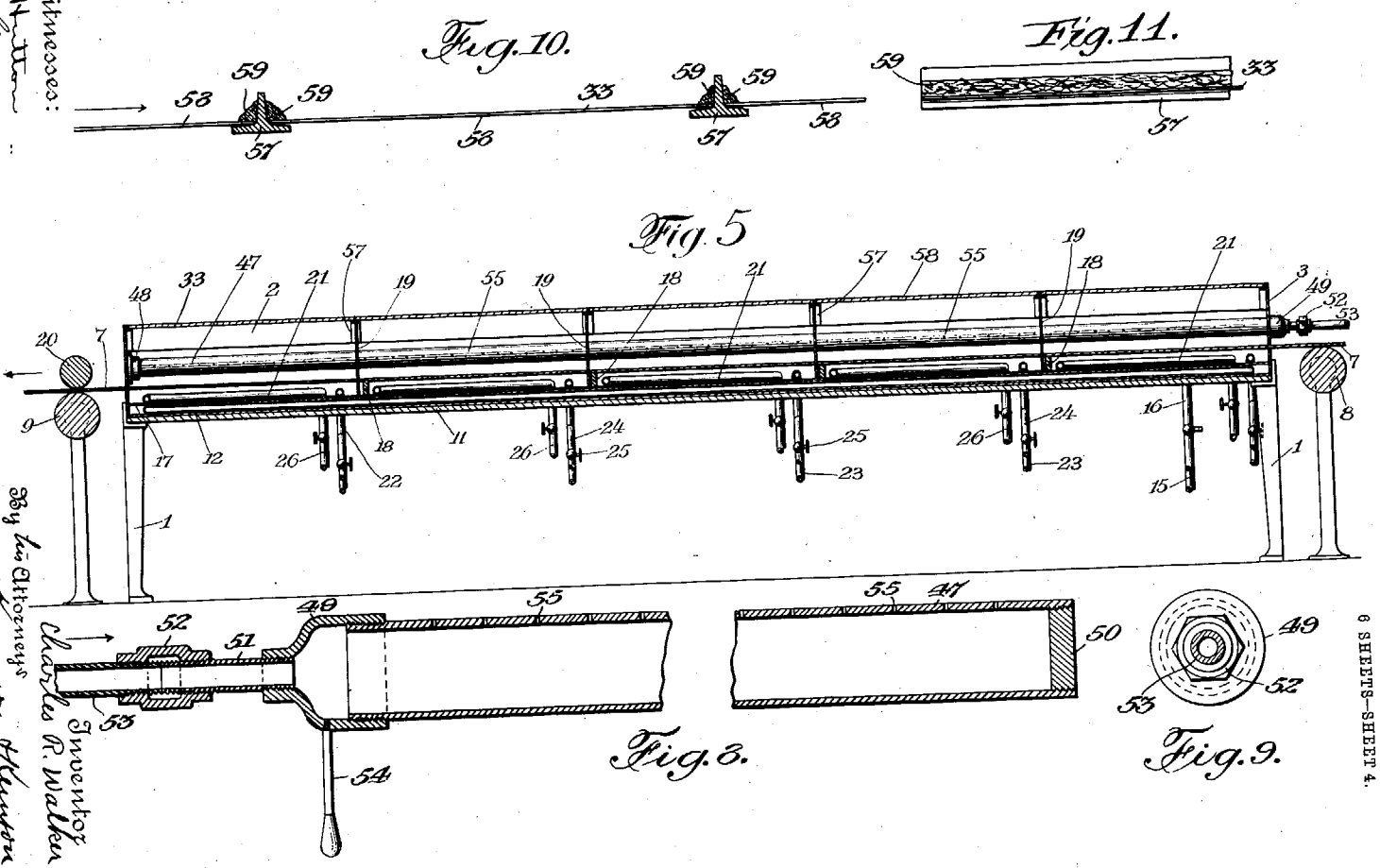
Figure 6:
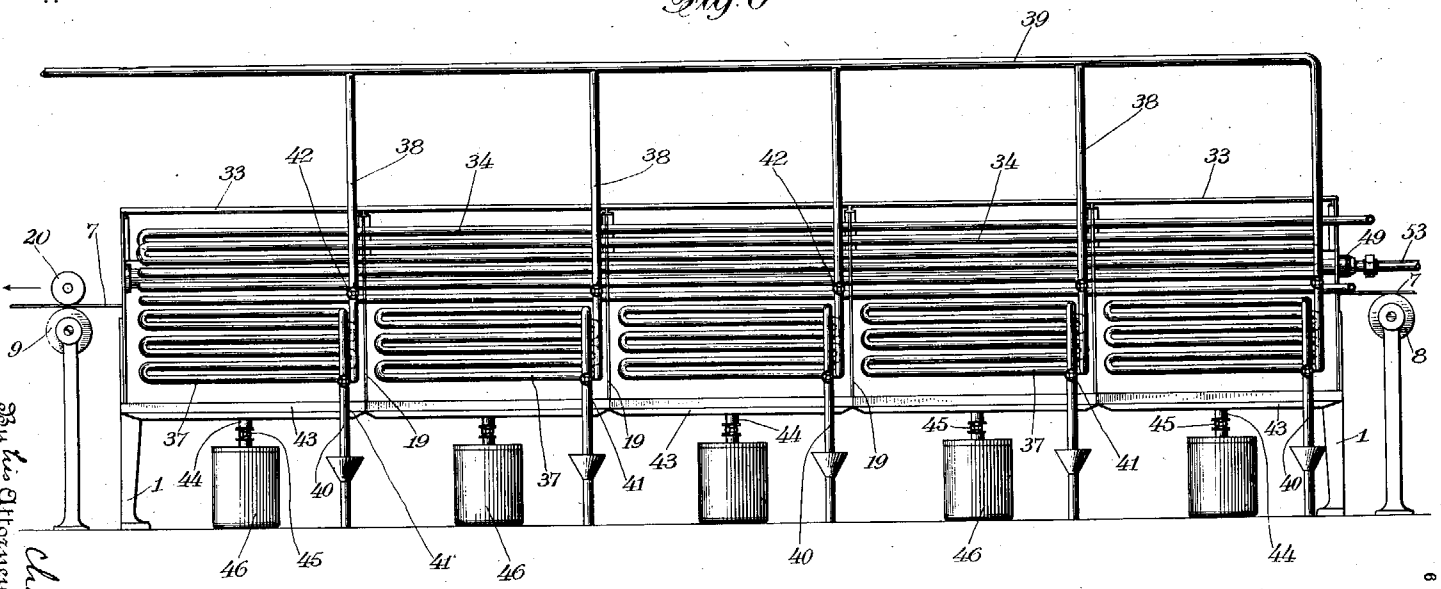
Figure 7:
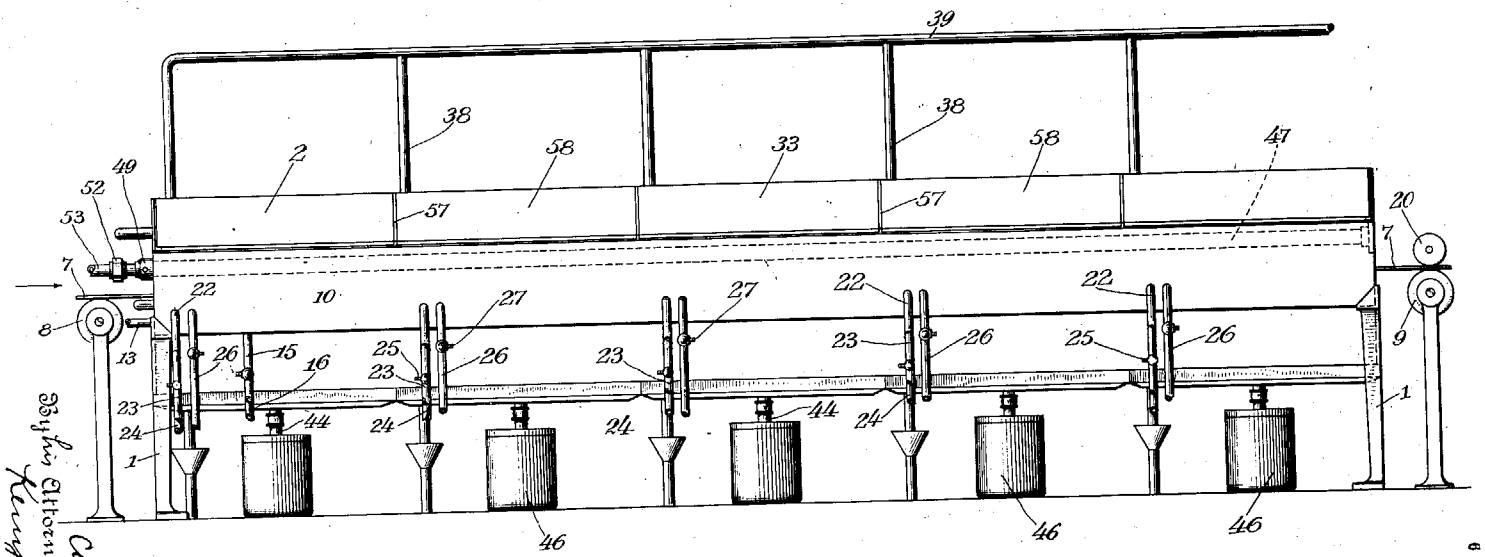

In the drawings, Figure 1 is a front end view of the apparatus; Fig. 2 is a vertical cross-section thereof, taken on the line II—II of Fig. 3; Fig. 3 is a plan view of the apparatus, the top or roof, and the fabric being removed or broken away; Fig. 4 is a similar view, but with the upper set of heating coils and the intervening partition removed; Fig. 5 is a longitudinal vertical section, taken on the line V—V of Fig. 1; Fig. 6 is a side view of the condenser side of the apparatus, the side wall of the apparatus being removed; Fig. 7 is a side view of the apparatus from the side opposite the condenser means; Fig. 8 is a detailed view of the pipe for admitting air to the drying apparatus; Fig. 9 is an end view of the part shown in Fig. 8, looking in the direction of the arrow; Fig. 10 is a sectional detail of the roof construction, and Fig. 11 is a side view of parts shown in Fig. 10, looking in the direction of the arrow.

Referring to the various Figs. 1, 1, 1, 1, represent suitable uprights for supporting a chamber 2, in which the drying operation is carried out. The chamber 2 is provided with end walls 3 and 4 provided with narrow apertures 6 therein, for the entrance and exit of the imitation leather fabric 7.

At the front of the machine is provided a roll 8 for guiding the fabric into the chamber and at the exit end of the apparatus there is provided a roll 9 for properly guiding the fabric from the apparatus.

The chamber 2 is provided with a short side wall 10 on one side of the apparatus and with a bottom 11 made of suitable heat insulating material. Just above the bottom 11, is situated a set of heating coils 12, extending substantially the whole length of the chamber as clearly shown in Fig. 4. The heating medium for these coils may be either steam or hot water or other suitable medium, and enters through the pipe 13 to the junction 14, whence it splits, part going to one side set of coils 12 and part to the other side set of coils 12. The medium in these sets of coils 12, after traversing the various coils, passes out of the apparatus through the pipes 15 and 16 and is carried away in any suitable manner. Just above these heating coils 12 is placed a partition 17, preferably of metal or some suitable heat conducting material. Upon the partition or floor 17 are placed a number of transverse ribs or bearing members 18, upon which the fabric 7 rests as it passes through the chamber 2.

19 represents a series of heat insulating walls dividing the chamber 2 up into a series of compartments for purposes which will be hereinafter described. Each wall 19 is provided with a suitable opening therethrough just large enough to properly permit the fabric 7 to pass therethrough from one compartment to another. At the outer or exit end of the machine there is provided means such as a driving roll 20, which cooperates with the roll 9 to draw the fabric through the apparatus.

Lying in the bottom of each of the compartments formed by the walls 19, is a set of heating coils 21. These are clearly shown in Figs. 2, 3 and 5. The heating fluid enters each of these coils by means of a pipe 22 connecting with two pipes 23 and 24. Pipes 23 and 24 are provided with stop cocks 25, so that steam may be admitted through one and hot water may be admitted through the other of the pipes 23 and 24. That is, the stop cocks 25 may be adjusted for the admission of either steam or hot water. The heating fluid within each of the sets of coils 21, after passing about the same, exits through a pipe 26, provided with a stop cock 27, for regulating the amount of flow through the sets of heating coils 21. The fabric 7 passes through the apparatus in a horizontal direction directly over the heating coils 21 and supports 18, resting upon the supports 18 and traveling in close proximity to the heating coils 21.

Looking at Figs. 1, 2, 3 and 4, at the left hand side of the apparatus is shown a wall 28, made of suitable heat insulating material and extending a short distance above the fabric 7. A sloping wall 29, preferably of metal, having its upper end adjacent the top of the wall 28, inclines downwardly to a point 30. From this point a wall 31 extends downwardly and the two walls 29 and 31 form the right hand side of the condenser chamber. The left hand side of the wall of the condenser chamber is indicated by the numeral 32 and extends vertically up to the roof 33 of the chamber 2. Lying within the condenser chamber between the walls 29 and 32 is a series of condensing coils 34, which extend substantially the whole length of the chamber 2. Water or any other cooling fluid is admitted to the coils 34 through a pipe 35 and is drawn off through a pipe 36. It is noted that some of the condensing coils 34 lie above the top of the heat insulating wall 28, and therefore the condensing means may be said to extend materially above the wall 28. The advantages of this feature will be more clearly pointed out hereinafter. Below the coils 34 and situated below the constricted portion of the condensing chamber, between the walls 31 and 32, is a plurality of sets of condensing coils 37, one set for each of the compartments formed by the heat insulating walls 19. Each set of condensing coils 37 is provided with an inlet pipe 38, supplied from a main pipe 39. The coils 37 are provided with exit pipes 40 provided with shut-off valves 41. Valves 42 are also included in the supply pipes 38. Situated at the bottom of the condensing chamber is a series of pans 43, one corresponding to each of the compartments. These pans are for the purpose of collecting the condensate from the coils 34 and 37 and each is provided with a suitable outlet 44 provided with a valve 45. Below the outlet pipes 44 are arranged kegs or other suitable receptacles 46, for receiving the condensed solvents.

At the right of the chamber 2, as shown in Figs. 1, 2, 3, 5 and 7, there is provided a longitudinal pipe 47, arranged to be rotatable in a bearing 48 at one end of the machine and having a bearing at the front of the machine in the end wall 3. At the front of the machine a reducer 49 is screwed on to the pipe 47 and at the other end of the machine the pipe 47 is blocked up by a member 50. See Figs. 8 and 9. Connected with the coupling 49 is a piece of pipe 51, having its other end connected with a coupling member 52, which also has connected thereto a pipe 53. A handle 54 is suitably secured to the coupling member 49, so that pipe 47 may be easily adjusted in any desired position. Air or other suitable gas is admitted through the pipe 53 and thence to the pipe 47, where it is stored. The pipe 53 is rigid and when the coupling member 52 is tightened up it also holds the coupling 49 and pipe 47 substantially rigid, the members 51, 49 and 47 being at all times rigid with respect to one another. By loosening the coupling nut 52, the handle 54 may then be turned, thus slightly rotating the pipe 47 to any desired position, after which the coupling nut 52 may be tightened up, thus maintaining the pipe 47 in this desired position. The pipe 47 is provided with a series of small apertures 55 therein, out of which air or other gas is emitted from the pipe 47 into the compartments of the chamber 2. These apertures 55 are preferably made about $\frac{3}{16}$ of an inch in diameter and placed about 3 inches apart. The air or other medium ejected from the pipe 47 is preferably directed across or transversely to the fabric 7, and is given a slight upward direction as indicated by the arrow 56 in Fig. 2.

The roof 33 of the apparatus is preferably constructed as shown in detail in Figs. 10 and 11. A suitable frame is provided with inverted T-beams 57 and upon the lateral flanges of these beams are laid sheets 58, preferably metallic. These sheets 58 extend from one side of the apparatus to the other over the chamber 2 and condensing coils 34. The joints between the sheets 58 and the inverted T-beams 57 are preferably cemented up as shown at 59 in Figs. 10 and 11. In this manner a substantially air tight roof is formed, yet in case of an explosion of gases within the apparatus the plates and cemented joints of the roof will readily give way, thus allowing the roof to be lifted upwardly and giving freedom to the exploded gases so that a minimum amount of damage will be done.

In general, the operation of my improved system and apparatus is as follows: The fabric 7 is slowly passed through the apparatus in the direction indicated by the arrows. The heating coils 12 are supplied with suitable heating medium so that they will tend to produce a comparatively low uniform temperature throughout the length of the chamber 2. For this purpose either steam, hot water or other suitable material may be used. The heating coils 21 are also supplied with heating fluid, but are so regulated that those at the front of the machine will produce a much less heating effect than the others. These coils increase the temperature intended to be produced by the lower coils 12 and produce different temperatures in each of the compartments formed by the walls 19. Thus, as the fabric enters the first compartment, it is subjected to a relatively low temperature, but as it proceeds from compartment to compartment, the temperature of the fabric is gradually increased so that it passes through zones of gradually increasing temperature, until it finally reaches the exit end of the chamber 2 and is drawn out of it by means, such as the rolls 9 and 20.

As above pointed out, I have particularly devised my improvements with respect to the drying of imitation leather and in such systems the fabric enters the apparatus containing a large amount of solvents which it is desired to dry out and recover if possible. As the fabric 7 passes through the various compartments, the solvents with the lower boiling points are given off near the entrance end of the apparatus, the solvents of a somewhat higher boiling point or points are given off near the center of the apparatus, while solvents of the highest boiling points are given off near the exit end of the apparatus. Thus, the solvents given off by the fabric are fractionally divided up so that they may be recovered in a more or less pure state.

The solvents given off thoroughly saturate the atmosphere within the various compartments so that evaporation takes place in a substantially saturated atmosphere. After being evaporated from the fabric, the solvents come into contact with the condensing coils 34, whence substantially all of the solvents are condensed, and drip downwardly and are collected by the pans 43, from which they are carried into the receptacles 46 by means of the pipes 44.

The coils 34 are so designed that they will condense substantially all of the solvents given off in that part of the apparatus and the coils 37 are provided to prevent any reëvaporation of the solvents as they pass downwardly. Since some of the solvents are given off at higher temperatures than others, it is found desirable that the condensing means be divided into groups, as indicated by the sets of coils 37, so that the temperature of the condensing means in any compartment may be varied to suit the conditions of that particular compartment, thus the condensing portion of one compartment may be given a somewhat lower or higher temperature than that of other compartments by properly regulating the flow of cooling fluid through its condensing coils 37. This aids materially in the proper condensation of the various solvents and vapors given off by the material being dried.

I find it desirable in getting an improved quality of material and also in causing or aiding the production of a proper flow of the vapors in the chamber 2, to cause the admission of air or similar gases in very small quantities at one side of the fabric. To this end the pipe 47 has been provided as above set forth. Air under a slight pressure is admitted to this pipe and flows out under a slight pressure through the openings 55 and in the general direction of the arrow 56 of Fig. 2. This causes the vapors given off by the fabric 7 to be gradually moved toward the condenser coils 34 and thereby promotes proper flow of the vapors. As above pointed out, the direction in which this air is emitted may be adjusted by slightly rotating the pipe 47. It is found to be advantageous if the air is directed in most any direction transversely of the fabric 7, but I prefer to give it a slightly upward direction directly toward the condenser coils 34. The admission of this air or other gas is so small in amount that it does not materially decrease the saturation of the atmosphere, but the drying operation still continues in a substantially saturated atmosphere. I find this desirable since a much better product is obtained which is substantially free from bubbles or pin holes. The passing of the fabric through zones of gradually increasing temperature is also conducive to the production of a fabric without bubbles, pin holes or blisters and, in general, to a fabric of much better quality.

As shown, some of the condenser coils 34 lie very materially above the heat insulating wall 28 and this is important since the vapors more readily and quickly come into contact with the coils 34, thereby causing immediate condensation without loss of time or space. This adjustment of the coils 34 also tends to produce a slight vacuum at this point due to the condensation of the vapors, thereby aiding to a certain extent in promoting the movement of gases in the chamber 2. I also provide the roof 33, inclined as shown downwardly from the condenser 34, so that as the vapors tend to rise they are directed upwardly and laterally toward the condenser coils 34. This feature aids materially in promoting the proper flow of the vapors and in cutting down the space and volume of gases and vapors within the apparatus. The above features, causing the proper flow of the vapors are extremely important, since the desired flow is obtained without the aid of any mechanical appliance such as a fan or vacuum chamber. Such appliances usually produce altogether too great a flow, so that it is impossible for the drying action to take place in a saturated or nearly saturated atmosphere, and fabrics treated by such apparatus are usually of much inferior quality. With my improvements the flow is just sufficient to cause a gradual and very slow movement of the vapors toward the condensing coils, this flow being adjusted at will by regulating the condensing action of the coils 34 or adjusting the direction and amount of the flow of air from the pipe 47. The air which is admitted from the pipe 47 intermingles with the vapors and causes a better quality of material to be produced. This air finally finds its way out through the pipe 44 into the surrounding room. By actual experience, I find that the condensation produced is so complete that substantially no vapor comes out with this air which would be objectionable. By movement of the vapors transversely of the movement of the material they are more quickly brought into contact with the condensing means and are rapidly removed, and yet the drying is allowed to take place in a substantially saturated atmosphere.

It will be noted that the chamber 2 is very long as compared with its width and very wide as compared with its height. This construction is extremely important, especially in connection with drying apparatus which is adapted to dry out solvents from fabrics of the class mentioned. By providing the chamber very long as compared with its width and very wide as compared with its height, the length is made ample to allow of a complete drying of the material, before it is drawn out of the machine and the volume of vapors in the machine is reduced to a minimum, so that the danger of explosions is correspondingly reduced, and even if an explosion occurs, the volume of vapors and gases is so small that the danger and damage done is also correspondingly reduced.

It will be understood that certain parts may be omitted and still very good results be obtained. Moreover, while I have described several features of construction and arrangement which are novel and advantageous, my invention, in its broader phases, is not limited to the employment of all of such features together, and although I have described my invention with respect to a preferred embodiment thereof, and have described the same in great detail, I do not desire to be limited to such details except as specified in the appended claims, since many changes and modifications may well be made by those skilled in the art without departing from the spirit and scope of my invention. But Having fully and clearly described my improvements, what I claim as new and desire to secure by Letters Patent is:

1. In a system of the class described, a suitable containing apparatus, means for causing the material to be passed horizontally through the apparatus, means for heating the material as it passes through the apparatus and increasing the temperature thereof as it progresses toward the exit end of the apparatus, condensing means located at one side of the material, and a heat insulating wall between the condensing means and the material, said condensing means extending materially above said wall and said apparatus being provided with a roof inclining upwardly toward the condensing means to promote the movement of the gases.

2. In a system of the class described, a suitable containing apparatus, means for causing the material to be passed horizontally through the apparatus, means for heating the material as it passes through the apparatus and increasing the temperature thereof as it progresses toward the exit end of the apparatus, condensing means located at one side of the material, and a heat insulating wall between the condensing means and the material, said condensing means extending materially above said wall and said apparatus being provided with a roof inclining upwardly toward the condensing means to promote the movement of the gases, and means for admitting air under pressure at the opposite side of the apparatus from the condensing means to cause the air to pass in a general horizontal direction over the material.

3. In a system for drying fabrics, a suitable containing apparatus, means for causing the fabric to be passed horizontally through the apparatus, means for heating the fabric as it passes through the apparatus and increasing the temperature thereof as it progresses toward the exit end of the apparatus.

4. In a system of the class described, a suitable chamber, means for causing the material to be gradually passed through said chamber, means for heating the material as it passes through the chamber and increasing the temperature thereof as it progresses toward the exit end of the chamber, and means for causing the vapors driven off from the material to be moved away therefrom in a general horizontal direction transverse to the movement of the material.

5. In a system for drying fabrics and the like, a suitable chamber, means for causing the fabric to be gradually moved through said chamber longitudinally, means for progressively heating the fabric as it passes through the chamber and means for condensing the vapors given off by said fabric.

6. In a system for drying coated fabrics, a suitable chamber, means for causing the fabric to be gradually moved through said chamber longitudinally, means for progessively heating the fabric as it passes through the chamber and means for condensing the vapors given off by said fabric, said condensing means being divided into groups corresponding to different stages of heating.

7. In a system for drying coated fabrics, a suitable chamber, means for causing the fabric to be gradually moved through the chamber, means for heating the fabric as it passes through the chamber, and means for causing the vapors given off by the fabric to be taken to one side of the fabric, said chamber having a roof inclined transversely to the direction of movement of the fabric to promote the movement of the vapors.

8. In a system of the class described, a suitable chamber, means for causing the material to be gradually moved through said chamber in a substantially horizontal direction, means for heating the material as it passes through the chamber, and means for causing the vapors given off by the material to be taken to one side of the material, said chamber having a roof inclining transversely of the movement of the material to promote the movement of the vapors.

9. In a system for drying coated fabrics and similar material, a suitable chamber, means for causing the material to be gradually moved through said chamber in a substantially horizontal direction, means for heating the material as it passes through the chamber and means for condensing the vapors given off by the material, said chamber having a roof inclining transversely of the movement of the material to promote the movement of the vapors toward the condensing means.

10. In a system for drying coated fabrics, a suitable chamber, means for causing the fabric to be gradually moved through said chamber in a substantially horizontal direction, means for heating the fabric as it passes through the chamber and condensing means at one side of the fabric, said chamber having a roof inclining from said condensing means downwardly and transversely of the movement of the fabric to the other side of the fabric.

11. In a system of the class described, a suitable chamber, means for causing the material to be gradually moved through said chamber in a substantially horizontal direction, means for heating the material as it passes through the chamber and gradually increasing the temperature of the material as it progresses toward the exit end of the chamber and means for condensing the vapors given off by the material, said chamber having a roof inclining transversely of the movement of the material to promote the movement of the vapors toward the condensing means.

12. In a system of the class described, a suitable chamber, means for causing the material to be gradually passed through the chamber, condensing means located in operative relation to said chamber, and a heat insulating wall arranged between the material and condensing means, said condensing means lying above said wall to promote the movement of the vapors given off by the material.

13. In a system for drying coated fabrics, a suitable chamber, means for causing the fabric to be gradually passed through the chamber, means for heating the fabric and gradually increasing the temperature of the material as it passes through the chamber, condensing means located in operative relation to said chamber, and a heat insulating wall arranged between the fabric and condensing means, said condensing means lying above said wall to promote the movement of the vapors given off by the fabric.

14. In a system for drying coated fabrics, a suitable chamber divided into substantially closed compartments, means for causing the fabric to gradually pass through said compartments and means for applying different degrees of heat to said compartments so that the temperature of the fabric is gradually increased as it progresses toward the exit end of the chamber.

15. In a system for drying coated fabrics, a suitable chamber, means for causing the fabric to gradually pass through said chamber, condensing means in operative relation to said chamber, said condensing means being divided into groups corresponding to different positions of the fabric.

16. In a system of the class described, a suitable chamber, means for causing the material to pass therethrough in a horizontal direction, means for applying successively increasing degrees of heat to the material as it passes through the chamber, condensing means in operative relation to said chamber, said chamber having a heat insulating wall between the material and condensing means, said condensing means extending above said wall to promote circulation, said condensing means being divided into groups corresponding to different positions of the material so that different vapors will be condensed at different parts of the chamber, heat insulating walls between the various groups, and means for emitting air or other gas at one side of the chamber opposite the condensing means and causing the air or gas to flow in a general horizontal direction over the material substantially at right angles to the movement of the material, said chamber having a roof inclining upwardly from adjacent the air or gas emitting means and toward the condensing means.

17. In a system of the class described the combination with the walls forming a main chamber, relatively wide as compared with its height, and relatively long as compared with its width, of a narrow flue facing the highest side wall substantially its whole length forming a condensing chamber which at the vertical end of said flue is enlarged and extends inwardly toward the center line of the main chamber, condensing pipes extending above the upper end of the inner wall of said flue and means for heating said chamber.

18. In a system of the class described, a suitable chamber, means for causing the material to be dried to pass gradually through the chamber, means for heating the material and gradually increasing the temperature thereof as it approaches the exit end of the chamber, and condensing means suitably located in respect to said chamber, said condensing means being divided into groups corresponding to different positions of the material and said chamber having a roof inclining upwardly toward the condenser to promote the movement of the vapors thereto.

19. In a system for drying coated fabrics, a suitable chamber, means for causing the fabric to be dried to pass gradually through the chamber, means for heating the fabric and gradually increasing the temperature thereof as it approaches the exit end of the chamber, condensing means suitably located in respect to said chamber, said condensing means being divided into groups corresponding to different positions of the fabric, and said chamber having a roof inclining upwardly toward the condenser to promote the movement of the vapors thereto and a suitable wall between said fabric and condensing means, and said condensing means lying above said wall to more quickly contact with the vapors and promote the circulation thereof.

20. In a system of the class described, a suitable chamber divided into substantially closed compartments by heat insulating walls, means for causing the material to be dried to pass gradually through the chamber, means for heating the material and gradually increasing the temperature thereof as it approaches the exit end of the chamber, condensing means suitably located in respect to said chamber, said condensing means being divided into groups corresponding to different positions of the material and said chamber having a roof inclining upwardly toward the condenser to promote the movement of the vapors thereto and a suitable wall between said material and condensing means, and said condensing means extending materially above said wall to more quickly contact with the vapors and promote the movement thereof.

21. In a system of the class described, a relatively long shallow chamber, means for causing the material to be dried to pass gradually through said chamber, and condensing means operatively related to said chamber, said chamber having a roof inclined transversely of the movement of the material and toward the condensing means to promote the movement of the vapors toward the condenser.

22. In a system for drying coated fabrics, a suitable drying chamber, means for causing the fabric to be dried to pass gradually through said chamber, condensing means operatively related to said chamber but lying wholly at one side of said chamber, said chamber having a roof inclined transversely of the movement of the fabric, and toward the condensing means to promote the movement of the vapors toward the condenser, and a wall between said fabric and condensing means, said condensing means lying above said wall for the purposes set forth.

23. In a system of the class described, a suitable chamber relatively wide as compared with its height and relatively long as compared with its width, means for causing the material to gradually pass through said chamber, condensing means in operative relation to said chamber, and a wall between said material and condensing means, said condensing means lying above said wall, and said chamber having a roof inclining downwardly from said condensing means transversely of the movement of the material to promote the movement of the vapors toward the condenser.

24. In a system of the class described, a suitable chamber, divided into substantially closed compartments, means for causing the material to gradually pass through said chamber, condensing means in operative relation to said chamber, and a wall between said material and condensing means, said condensing means lying above said wall and said chamber having a roof inclining downwardly from said condensing means transversely of the movement of the material to promote the movement of the vapors toward the condenser.

25. In an apparatus for the drying of coated fabrics, a rectangular chamber, means for passing the coated fabric longitudinally therethrough, a heater beneath the fabric, means for admitting air into the chamber at one side of the fabric, a heat insulating wall at the other side of the fabric and condenser coils lying above said wall.

26. In a system of the class described, a suitable chamber, means for causing the material to be dried to pass gradually through said chamber, said chamber being divided into substantially closed compartments, means for heating the compartments and material so that the temperature of the material gradually increases as it passes toward the exit end of the chamber and condensing means in operative relation thereto, said condensing means being divided into groups corresponding to different compartments.

27. In a system of the class described, a suitable chamber, means for causing the material to be dried to pass gradually through said chamber, means for applying heat to the chamber and increasing the temperature of the material as it approaches the exit end of the chamber, condensing means operatively related to said chamber, and a wall between said condensing means and material, said condensing means lying above said wall to promote the movement of the vapors given off by the material, thereto.

28. In a system of the class described, a suitable chamber, means for causing the material to be dried to pass gradually through said chamber, said chamber being divided up into a plurality of substantially closed compartments, and means for applying different temperatures to the material in said compartments, said chamber and compartments having a roof inclined transversely to the movement of the material to promote the movement of the vapors given off by the material.

29. In a system for drying coated fabrics, a suitable chamber, means for causing the fabric to be dried to gradually pass therethrough, means for heating the fabric as it passes through the chamber, and means for admitting air at one side of the chamber and causing it to travel over the fabric in a general horizontal slightly upward direction transversely with respect to the movement of the fabric.

30. In a system of the class described, a suitable chamber, means for causing the material to be dried to gradually pass therethrough, means for heating the material as it passes through the chamber, and means for admitting air under pressure at one side of the chamber and causing it to travel over the material transversely with respect to the movement of the material.

31. In a system of the class described, a suitable chamber, means for causing the material to gradually pass therethrough horizontally, a condenser at one side of the chamber and means for admitting a gas at the other side of the chamber and causing it to pass over the material transversely of the movement of the material and toward the condenser.

32. In a system for drying coated fabrics, a suitable chamber, means for causing the fabric to gradually pass therethrough horizontally and means for admitting a gas at one side of the chamber and causing it to pass over the fabric in an inclined direction transversely of the movement of the fabric.

33. In a system of the class described, a suitable chamber, means for causing the material to gradually pass therethrough, means for heating the material as it passes through the chamber and causing the temperature thereof to increase as the material approaches the exit end of the chamber, and means for admitting a gas at one side of the chamber and causing it to pass over the material transversely of the movement of the material.

34. In an apparatus for the drying of coated fabrics, a rectangular chamber having a length and width relatively great as compared with its height, means for passing the coated fabric longitudinally therethrough, a heater beneath the fabric, means for admitting air into the chamber at one side of the fabric, a heat insulating wall at the other side of the fabric and condenser coils lying above said wall.

35. In a system of the class described, a suitable chamber, means for causing the material to gradually pass therethrough, means for heating the material as it passes through the chamber, a condensing means at one side of the material, a wall between the material and condensing means, said condensing means lying above said wall and said chamber being provided with a roof inclining downwardly from said condensing means and transversely of the movement of the material, and means for admitting a gas at one side of the chamber and causing it to pass over the material transversely of the movement of the material.

36. In a system for drying coated fabrics, a suitable chamber, means for causing the fabric to travel horizontally through said chamber, means for admitting air or similar medium under pressure at one side of said chamber so that it will pass over the fabric transversely of the movement of the fabric, and in planes slightly inclined to the fabric means for recovering the vapors given off by the fabric and allowing the air or similar medium to escape.

37. In an apparatus for evaporating solvents from fabrics and the like, a substantially closed chamber relatively long as compared with its width and relatively wide as compared with its height, means for causing a sheet or strip of fabric to gradually pass through said chamber adjacent the bottom thereof, and heating means extending adjacent the bottom of the chamber and adjacent said sheet or strip for heating the fabric as it passes through the chamber.

38. In an apparatus of the class described, a horizontally arranged relatively long and thin chamber, heating means at the base of the chamber, and a container extending along one side of the chamber, said container having holes therein along its length for the emission of air or a similar medium.

39. In an apparatus of the class described, a horizontally arranged chamber, a plurality of independent heating means at the base of said chamber for producing different temperatures in different parts of said chamber and heating means at the base of the chamber extending substantially the whole length thereof to tend to produce an even temperature throughout the length of said chamber.

40. In an apparatus of the class described, a horizontally arranged chamber, a plurality of independent condensing means at one side of said chamber for condensing different vapors at different points along the length of said chamber, and condensing means extending substantially the whole length of the chamber at one side thereof.

41. In a system for drying coated fabrics, a suitable chamber and means at one side of the fabric for condensing the vapors given off by the fabric, said chamber having a roof inclining transversely of the movement of the fabric to promote the movement of the vapors toward the condensing means.

42. In a system of the class described, a suitable chamber, means for heating the material to be dried in the chamber, a condenser at one side of the chamber and the material being dried, said chamber having a roof inclined transversely of the movement of the material to promote the movement of the vapors toward the condenser, and a wall between said material and condensing means, said condensing means extending materially above said wall for the purposes set forth.

43. The improved process for drying imitation leather which consists in causing the same to be gradually passed through zones of gradually increasing temperatures causing small amounts of air or similar medium to move over the material transversely of the movement thereof, condensing the vapors given off by the material, allowing the air or similar medium to escape and causing the drying to take place in an atmosphere substantially saturated with the vapors given off by the material.

44. The improved process for drying imitation leather which consists in causing the same to be gradually passed through zones of gradually increasing temperatures, causing small amounts of air or similar medium to move over the material transversely of the movement thereof, condensing the vapors given off by the material and causing the drying to take place in an atmosphere substantially saturated with the vapors given off by the material.

45. The improved process for drying imitation leather which consists in causing the same to be gradually passed through zones of gradually increasing temperatures, causing small amounts of air or similar medium to move over the material transversely of the movement thereof and causing the drying to take place in an atmosphere substantially saturated with the vapors given off by the material.

46. The improved process for drying imitation leather which consists in causing the same to be gradually passed through zones of gradually increasing temperatures, causing small amounts of air or similar medium to pass over the material transversely of the movement thereof and condensing the vapors given off by the material and allowing the air or similar medium to escape.

47. The improved process for drying imitation leather which consists in causing the same to be gradually passed through zones of gradually increasing temperatures, causing small amounts of air or similar medium to pass over the material transversely of the movement thereof and condensing the vapors given off by the material.

48. The improved process for drying imitation leather which consists in causing small amounts of air or similar medium to move over the material transversely and slightly inclined to the surface of the material, condensing the vapors given off by the material, allowing the air or similar medium to escape and causing the drying to take place in an atmosphere substantially saturated with the vapors given off by the material.

49. The improved process for drying imitation leather which consists in causing small amounts of air or similar medium to move over the material transversely and inclined to the surface of the material, condensing the vapors given off by the material and causing the drying to take place in an atmosphere substantially saturated with the vapors given off by the material.

In testimony whereof, I have signed my name to this specification, in the presence of two subscribing witnesses.

CHARLES R. WALKER.

Witnesses:

WILLIAM R. GALT,
SLOAN LAMONT, Jr.